United States Patent [19]
Sangeeta et al.

[11] Patent Number: 5,985,368
[45] Date of Patent: Nov. 16, 1999

[54] COATING COMPOSITION FOR METAL-BASED SUBSTRATES, AND RELATED PROCESSES

[75] Inventors: D. Sangeeta, Niskayuna; Lawrence Edward Szala, Scotia; David Winfield Woodruff, Clifton Park, all of N.Y.; Bangalore Aswatha Nagaraj, West Chester, Ohio; Daniel Scott McAtee, Dublin, Ireland; Clifford Lawrence Spiro, Niskayuna, N.Y.

[73] Assignee: General Electric Co., Schenectady, N.Y.

[21] Appl. No.: 09/013,272

[22] Filed: Jan. 26, 1998

Related U.S. Application Data

[62] Division of application No. 08/745,232, Nov. 8, 1996, Pat. No. 5,759,932.

[51] Int. Cl.$^6$ .............................. B05D 3/02; B05D 3/08; B05D 1/38
[52] U.S. Cl. ............................ 427/376.4; 427/376.2; 427/379; 427/419.3; 427/419.4
[58] Field of Search .............................. 427/224, 376.2, 427/376.4, 379, 419.3, 419.4

[56] References Cited

U.S. PATENT DOCUMENTS

| | | | |
|---|---|---|---|
| 3,975,165 | 8/1976 | Elbert et al. | 29/182.2 |
| 4,450,184 | 5/1984 | Longo et al. | |
| 4,965,095 | 10/1990 | Baldi | 427/142 |
| 5,034,358 | 7/1991 | MacMillan | 501/106 |
| 5,514,482 | 5/1996 | Strangman | |

OTHER PUBLICATIONS

1853400 NTIS Accession No.: N95–26133/5/XAB "Thermal Conductivity of Zirconia Thermal Barrier Coatings" (Abstract)–Oak Ridge National Lab., TN. Mar. 95.
1753380 NTIS Accession No.: DE94000746/XAB–"Thin-Wall Hollow Ceramic Spheres from Slurries". Quarterly Project Status report, Jan. 1–31 Mar., 1991.
03846965–EDB 95–090733 "Thermal Conductivity of Zirconia Thermal Barrier Coatings", Dinwiddle, R.B., Beecher, S.C., Nagaraj, B. A., Moore, C.S.–Mar. 1995.
"Ceramic Slurry Coatings for Advanced Heat Engines", by L. Kamo et al., Proceedings of the International Thermal Spray Conf. & Exposition, Orlando, FL, May 28–Jun. 5, 1992, pp. 45–49.
"ORNL Finds Spheres Could Make a Good Insulation", Oak Ridge National Laboratory Review, vol. 23, No. one 1990, pp. 89–92.

*Primary Examiner*—Shrive Beck
*Assistant Examiner*—Michael Barr
*Attorney, Agent, or Firm*—Noreen C. Johnson; Douglas E. Stoner

[57] ABSTRACT

An improved thermal barrier coating for metal substrates such as superalloys is disclosed. The coating is a slurry composition, comprising spheres of zirconia, at least some of which are hollow, contained within a porous oxide matrix, such as aluminosilicate. The slurry composition can be applied by slurry casting or similar techniques to the desired surface. Coating methods are also described. In general, they involve the application of successive layers of variations of the slurry composition, with various curing techniques used between layers and after the final coating is applied. Another embodiment of this invention embraces a composite coating, comprising (i) an oxide matrix phase; (ii) zirconia spheres embedded in the oxide matrix; and (iii) a porous phase.

15 Claims, No Drawings

COATING COMPOSITION FOR METAL-BASED SUBSTRATES, AND RELATED PROCESSES

This application is a division of application Ser. No. 08/745,232, filed Nov. 8, 1996, now U.S. Pat. No. 5,759,932 which is hereby incorporated by reference in its entirety.

TECHNICAL FIELD

This invention relates generally to coatings technology. More specifically, it is directed to protective coatings for metal substrates, and to improved techniques for applying such coatings.

BACKGROUND OF THE INVENTION

Metal parts which are exposed to high temperatures often require specially-formulated protective coatings. Aircraft engine parts are but one example. Combustion gas temperatures present in the turbine engine of an aircraft are maintained as high as possible for operating efficiency. Turbine blades and other elements of the engine are usually made of alloys which can resist the high temperature environment, e.g., superalloys, which have an operating temperature limit of about 1000° C.–1100° C. Operation above these temperatures may cause the various turbine components to fail and damage the engine.

The protective coatings, often referred to as thermal barrier coatings or "TBC"s, effectively increase the operating temperatures of the alloys which are used in high-temperature environments. Most of them are ceramic-based, e.g., based on a material like zirconia (zirconium oxide), which is usually chemically stabilized with another material such as yttria For a jet engine, the coatings are applied to the surfaces of turbine blades and vanes—usually over an intervening bond layer.

Techniques for depositing thermal barrier coatings like zirconia are known in the art. One method commonly used in the past is plasma-spraying. In this technique, an electric arc is typically used to heat various gasses such as air, nitrogen, or hydrogen to temperatures about 8000° C. or greater. The gasses are expelled from an annulus at high velocity, creating a characteristic flame. Powder material is fed into the flame, and the melted particles are accelerated toward the substrate being coated.

Another technique for depositing thermal barrier coatings is physical vapor deposition (PVD). In one exemplary type of PVD, an ingot of the ceramic material being deposited on the substrate is placed in a chamber which is evacuated. The top end of the ingot is then heated by an intense heat source (from an electron beam or laser, for example), so that it melts and forms a molten pool. A portion of the very hot, molten ceramic evaporates and condenses on the substrate, and a coating is gradually built up as the ingot is raised to replenish the molten pool.

It's clear that there are many advantages to using plasma spray or PVD techniques to deposit thermal barrier coatings. In general, the coatings resulting from either technique are of good quality and durability. Each technique has various advantages over the other. For example, thermal barrier coatings deposited by PVD are normally thinner than those deposited by air plasma spraying, and therefore add less weight to an aircraft engine. They are also especially adherent to smooth, underlying surfaces. On the other hand, plasma-sprayed barrier coatings often provide better insulation than PVD coatings, and their durability in some situations is also exceptional.

However, both plasma spray and PVD exhibit some disadvantages. First, each technique primarily involves line-of-sight deposition. It's therefore very difficult—if not impossible—to coat surfaces in constricted areas. Furthermore, the coating of large parts by PVD is difficult because of size limitations for the required vacuum chambers.

Moreover, repairing TBC's by either technique is difficult. Complete disassembly of the part from attached structures is required for PVD, while partial disassembly of the part may be required for plasma spray. Repairs to the coatings may also require removal of the prior TBC from a large section of the part, along with possible removal of any underlying bond coat (which may also require replacement). Removal of these coatings can be laborious, as can preparation of the part surface for the replacement coatings.

In general, field repairs for TBC's are very difficult with either plasma spray or PVD. Each technique requires large, bulky equipment which is not designed for easy portability. Furthermore, the various factors involved in depositing high quality coatings by either technique may be difficult to maintain in the field.

Thus, it appears that improved methods for providing protective coatings on metal substrates would still be welcome in the art. These techniques would hopefully be especially suitable for the repairs of TBC's in the field, i.e., away from a fixed base which is usually present when large equipment must be used. Moreover, the techniques should be capable of use on small sections of a substrate, without having to strip all of the pre-existing coating from the part. The techniques should also require a minimum of large equipment, since the need for that equipment sometimes lowered productivity in prior art situations.

It's likely that the new coating processes envisioned here may require new coating formulations as well. It's important that these new formulations—once formed into TBC's—possess substantially the same quality as TBC's deposited by plasma spray or PVD. This is especially true when the substrate is a high-performance article like an aircraft engine part.

SUMMARY OF THE INVENTION

The improvements envisioned above have been substantially obtained by the discovery which forms the basis for the present invention. In one aspect, this invention embraces an improved thermal barrier coating for metal substrates such as superalloys. The coating is achieved from a slurry composition, comprising spheres of zirconia contained within a porous oxide matrix. In preferred embodiments, a substantial number of the zirconia spheres are hollow. Moreover, the oxide matrix is preferably one derived from silica, such as aluminosilicate.

The coating slurry composition can very easily be applied by slurry casting or similar techniques to the desired surface. One exemplary embodiment for applying the coating comprises the following steps:

(a) applying a layer of a slurry base composition which comprises spheres of zirconia contained within a porous oxide matrix, wherein the zirconia spheres are present at 0% to about 40% by weight, based on the weight of the entire base composition;

(b) heat-treating the applied base layer for about 5 minutes to about 60 minutes, at a temperature in the range of about 50° C. to about 150° C.;

(c) applying at least one successive, slurry top coating on top of the base layer to form a final coating, wherein at least one top coating is formed of a composition comprising spheres of zirconia contained within a porous oxide matrix, and wherein the zirconia spheres are present at about 25% to about 99% by weight, based on the total weight of the top coating;

(d) heat-treating each top coating after it is applied, by gradually increasing the temperature to which the top coating is exposed, from about 30° C. to about 800° C. over a time period sufficient to cure the coating; and (e) heat-treating the final coating for about 1 minute to about 60 minutes, at a temperature in the range of about 650° C. to about 1200° C.

The curing and heat-treating steps can be carried out by various techniques, such as furnace-curing, heat lamp-curing, or torching. In general, higher temperatures (within the given ranges) for each of the heating steps described above will be used for the shorter heating times within the respective time ranges, while longer heating times will be used with the lower heating temperatures. However, this does not always have to be the case.

The resulting coating composition generally has a high thermal expansion coefficient and melting point, along with low thermal conductivity and a variety of other attributes. Its overall quality is thought to approach that of TBC's deposited by plasma spray or PVD.

Some embodiments of this invention are directed to a coating composition which comprises two parts. The first part is slurry A, comprising a portion of a liquid carrier, an oxide material, and a portion of zirconia spheres. The second part is slurry B, comprising slurry A, along with another portion of the liquid carrier; and an additional amount of zirconia spheres. Various layers of slurry A and slurry B are applied to the substrate to form a barrier coating, as further described below.

Still another embodiment of this invention embraces a composite coating, comprising (i) an oxide matrix phase; (ii) zirconia spheres embedded in the oxide matrix; and (iii) a porous phase.

Other details regarding this invention are comprehensively provided in the sections which are to follow.

DETAILED DESCRIPTION OF THE INVENTION

In a general sense, slurry coatings are known in the art and described, for example, in the *Kirk-Othmer Encyclopedia of Chemical Technology*, 3rd Edition, Vol. 15, p. 257 (1981); and in the 4th Edition, Vol. 5, pp. 615–617 (1993), as well as in U.S. Pat. No. 5,043,378, incorporated herein by reference. The solid media of the slurry is incorporated into a liquid or "paint" medium, and then applied to the desired substrate. Typically, the applied coating is then cured and fired.

Many of the details regarding slurry formation are known in the art and need not be described extensively here. A good quality slurry is usually well-dispersed and free of air bubbles and foaming. It typically has a high specific gravity and good rheological properties adjusted in accordance with the requirements for the particular technique used to apply the slurry to the substrate. Moreover, the solid particle settling rate in the slurry should be as low as possible, and the slurry should also be chemically stable. Furthermore, when dry, the coating derived from the slurry should possess sufficient strength for subsequent steps, e.g., finishing and handling before firing.

There are also some desirable characteristics for the liquid vehicle of the slurry. It should usually possess a relatively low vapor pressure for liquid extraction and drying. The components in the liquid vehicle should also be compatible with the solid particles, and should be capable of dissolving and/or dispersing various additives in the slurry, such as deflocculants and anti-settling agents. Moreover, the liquid vehicle should of course be based on ingredients which, while effective, can be obtained for as low a cost as possible and are environmentally sound.

The zirconia spheres used for the present invention are available commercially, e.g., from METCO, Inc. It should be understood that, as used herein, "zirconia" is meant to also include blends with lesser amounts of other materials. In preferred embodiments, the zirconia is chemically stabilized by blending with materials such as yttrium oxide, calcium oxide, magnesium oxide, cerium oxide, scandium oxide, or mixtures of any of those materials. In one specific example, zirconia can be blended with about 1% by weight to about 20% by weight yttrium oxide (based on their combined weight), and preferably, from about 3%–10% yttrium oxide.

Methods for forming the spheres are also known in the art and described, for example, in U.S. Pat. No. 4,450,184, incorporated herein by reference. Usually, substantially all of the spheres have a size between about 5 microns and about 400 microns. In preferred embodiments, the size ranges from about 5 microns to about 150 microns. Measurements in this specification regarding the amounts of zirconium spheres are based on an assumed sphere density of about 2 g/cc to about 5 g/cc, as well as the proportion of hollow spheres being used. (The thickness of the shell of a hollow sphere is usually about 5 to 10 microns.)

Mixtures of hollow zirconia spheres and substantially solid zirconia spheres provide suitable results for many embodiments of this invention. However, in preferred embodiments, at least about 20% of the zirconia spheres are hollow, since a greater percentage of hollow spheres should result in lower thermal conductivity. In more preferred embodiments, at least about 50% of the zirconia spheres are hollow, while in some of the most preferred embodiments, at least about 70% of the spheres are hollow. The hollow spheres can readily be separated from raw material containing a mixture of spheres, based on size and density differences, for example. In preferred embodiments, the zirconia spheres are present in the slurry coating at about 20% to about 70% by volume, based on the total volume of the coating. In more preferred embodiments, the range is about 50% to about 65% by volume.

As mentioned previously, the zirconia spheres are contained within a porous oxide matrix. The oxide matrix should be one which will permit the slurry to be easily applied to a desired substrate, and which is of course compatible with the other slurry components. Moreover, the matrix should be capable of retaining the spheres in place (e.g., as a sort of glue) during curing, firing, and other processing operations. The matrix should have a melting point of at least about 850° C. for most applications of this invention. Preferably, the melting point should be at least about 1100° C. when the coating is to be used in more rigorous environments, e.g., as part of a TBC applied to a turbine engine part.

The thermal expansion coefficient of the oxide matrix should be greater than about $2 \times 10^{-6}$ in/in °C., and preferably greater than about $4 \times 10^{-6}$ in/in °C. However, these values are not always critical. Often, the coefficient for the zirconia oxide material forming the spheres, as well as the microstructure of the cured TBC itself (e.g., its porosity), will compensate for the lower coefficient of the matrix, as further described below. As a general rule, selection of the oxide matrix (as well as other components in the slurry) should be governed in part by the desire to have a thermal expansion coefficient for the cured and fired coating which is as close as possible to the thermal expansion coefficient of the material forming the metal-based substrate. As an illustration for superalloy substrates, which have a coefficient of about $12-16 \times 10^{-6}$ in/in °C., the coefficient for the cured and fired coating is preferably at least about 50% of that coefficient, and the selection of a matrix should be made with that guideline in mind.

The oxide which constitutes all or at least a portion of the oxide matrix is usually selected from the group consisting of aluminum oxide (alumina), calcium oxide, magnesium oxide, barium oxide, silicon dioxide (silica), titanium dioxide, zirconium dioxide, yttrium oxide, and mixtures of any of these materials. Preferred oxides within this group are alumina, calcium oxide, and magnesium oxide. In especially preferred embodiments, the oxide is usually based on a combination of alumina and silica. All of these materials are commercially available.

The silica may be derived from a variety of sources. In some embodiments, free silica could be used. However, binder-type materials may have to used in conjunction with the free silica, to ensure the appropriate rheology for the resultant slurry composition (e.g., the appropriate viscosity for slip casting or various other coating techniques). In preferred embodiments in which silica is employed, the silica is derived from a siloxane material. Non-limiting examples of suitable silica sources are polyalkylsiloxanes with a variety of terminating functional groups (e.g., hydroxy, amine, vinyl, alkoxy, halo, etc.), as well as various silicone emulsions. Silicone resins having a relatively high char yield are especially suitable, e.g., those which, when burned, yield at least about 65% silica, and preferably, at least about 80% silica. One commercial example of a suitable silicone resin is SR-350, available from General Electric Company. This material is a dry silicone binder with a silicon-oxygen backbone. It retains about 80% of its weight when heated to about 900° C. In general, the silicone resin also functions as an inorganic binding agent in the ceramic slurry composition.

When the oxide matrix comprises a combination of silica and another oxide such as alumina, the molar ratio between the silica and alumina usually ranges from about 30:70 to about 45:55; and preferably ranges from about 35:65 to about 40:60. In practice, a particular ratio is selected according to various factors, such as the requirements for thermal expansion, thermal conductivity, and thermal stability (e.g., the melting point) of the TBC's. For most embodiments of this invention, the ratio is made as close as possible to the stoichiometry of mullite, $3Al_2O_3 \cdot 2SiO_2$.

The matrix-portion of the slurry composition performs an important function in enclosing and constraining the zirconia spheres, acting as a sort of "glue". However, the matrix is a continuous-type phase in the composition, and it therefore may have the tendency to undesirably increase the overall thermal conductivity of the fired coating. For this reason, the matrix usually should constitute as small a component of the slurry composition as possible, as long as a desirable cohesive strength for the fired coating is maintained. In general, the matrix should comprise no greater than about 50% by volume of the total coating volume. In preferred embodiments, it should comprise no greater than about 30% by volume. In especially preferred embodiments, it should comprise no greater than about 5% by volume.

It should be apparent that in preferred embodiments, the matrix is aluminosilicate (also referred to as "aluminum silicate"). Such a material is found in nature, or can be obtained by various techniques. For example, one form of aluminosilicate is known as mullite, and it can be obtained by heating other aluminum silicates, such as cyanite and sillimanite. Other forms can be derived synthetically, e.g., by heating aluminum fluoride, silica, and water vapor at a high temperature. For the purpose of the present invention, however, aluminosilicate is formed as part of the overall preparation of the slurry, as described below.

Alternatively, the aluminosilicate -or other forms of oxide-based matrices could be prepared by a sol-gel process. These processes are known in the art and described, for example, in the *Kirk-Othmer Encyclopedia of Chemical Technology*, 4th Edition, Vol. 5 (and in citations in that volume); as well as in *Ullmann's Encyclopedia of Industrial Chemistry*, Fifth Edition; Volume A14, VCH Publisher (1989). The general process often utilizes metal-organic precursors such as acetylacetonates and alkoxides, e.g., alkoxides of aluminum, silicon, boron, or titanium. In one specific type of sol-gel technique, ceramic polymer precursors are formed in solution at ambient temperature; shaped by casting, film formation, or fiber drawing; and then consolidated by heating to form the desired matrix material.

Aluminosilicate matrices usually have a thermal expansion coefficient of about $4 \times 10^{-6}$ in/in °C. to about $6 \times 10^{-6}$ in/in °C. These values are relatively low as compared to the thermal expansion coefficient of a film based on yttria-stabilized zirconia, which exhibits a thermal expansion coefficient of about $10 \times 10^{-6}$ in/in °C. However, the resulting matrix still has an overall coefficient of expansion which matches closely with the expansion characteristics of typical, high performance alloys (e.g., superalloys), when the matrix is used with zirconia in the form of spheres (at least about 30% of them being hollow), as described previously.

The slurry composition also includes a liquid carrier. A variety of carriers may be used for this invention. Non-limiting examples include water, lower alcohols (i.e., 1–4 carbon atoms in the main chain) such as ethanol, halogenated hydrocarbon solvents such as tetrachloromethane; and compatible mixtures of any of these substances. Selection of a carrier used will depend on various factors (some of which were mentioned previously), such as: the evaporation rate required during subsequent processing; the effect of the carrier on the adhesion of the slurry coating to a substrate; the solubility of additives and other components in the carrier; the "dispersability" of powders in the carrier; the carrier's ability to wet the substrate to modify the rheology of the slurry composition; as well as handling requirements; cost; availability; and environmental/safety concerns. Those of ordinary skill in the art can select the most appropriate carrier by considering these factors.

Because of their usefulness in enhancing the "flowability" of the slurry and its adhesion to the substrate, chlorinated solvents like tetrachloromethane are often preferred, if any environmental issues regarding these materials can be adequately resolved. In other instances, water or alcohols like ethanol and isopropanol are the preferred carriers.

The amount of liquid carrier employed is usually the minimum amount sufficient to keep the solid components of the slurry in suspension. Amounts greater than that level may be used to adjust the viscosity of the slurry composition, depending on the technique used to apply the composition to a substrate. In general, the liquid carrier will comprise about 30% by weight to about 70% by weight of the entire slurry composition. Additional amounts of the liquid carrier may be used to adjust slurry viscosity prior to application of the coating.

A variety of other components may be used in the slurry coating composition. Most of them are well-known in areas of chemical processing and ceramics processing. As but one illustration, many are described in the Kirk-Othmer *Encyclopedia of Chemical Technology*, 4th Edition, Vol. 5, pp. 610–613. As an example, thickening agents are sometimes used to increase the viscosity of the composition, giving it enough "body" to become flowable yet still adhere to a substrate, prior to any curing. Other additives include dispersants (which break up flocs in a slurry); deflocculants, anti-settling agents, binders, plasticizers, emollients, and lubricants. (The terms "emollients" and "lubricants" are sometimes, but not always, used interchangeably.). Each of these additives may be used for a specific purpose, e.g., modifying the rheology of the slurry composition for a particular technique for depositing a coating on the substrate. Examples of emollients are the various glycol ethers e.g., the polyalkylene glycol monobutyl ethers. These materials help to provide a relatively smooth surface for the slurry coating. Those skilled in the art can determine the most effective concentration of each additive. In general, lubricants, thickeners, or emollients may each be used at a level in the range of about 0.01% by weight to about 10% by weight, and more preferably, about 0.19% by weight to about 2.0% by weight, based on the weight of the entire slurry composition.

Other additives may also be employed. For example, various surfactants and anti-foam agents may be used (usually in small amounts) to improve the dispersion in the slurry. They are usually effective in small amounts, e.g., less than about 5% by weight, based on the weight of the entire slurry composition. Examples of the anti-foam agents are fluorocarbons, dimethysilicones, and stearates. One specific example of an anti-foam agent is Emcol-CC-42, a polypropoxy quaternary ammonium chloride-based product. Again, those skilled in the art can determine the most appropriate additive and its most effective level without undue effort.

Several techniques for preparing the slurry compositions of the present invention would probably be effective. However, there are some preferences. For example, in the case in which the oxide matrix is based on silica and alumina, it is often desirable to initially mix the silica source with a portion of the liquid carrier. The ratio is usually about 0.25 gram to about 1 gram liquid carrier per gram silica, i.e., based on a calculation of silica resulting from its source. Often, an emollient such as one of the glycol-based materials is also added to this premix, usually at about 0.01 gram to about 0.1 gram per 1 gram of total weight premix. This technique is especially effective when the source of silica is a silicone resin, since the resin (along with the optional emollient), has low solubility and can be dissolved completely before adding the ceramic powder.

The premix is then mixed by conventional techniques, e.g., a paint mixer, ball mill, or via ultrasonic agitation, until the components appear to be homogeneously distributed. Ultrasonic agitation is often preferred because it reduces breakage of hollow zirconia spheres during mixing. A milling material is sometimes used to enhance mixing. Examples are beads of tungsten carbide, nylon, alumina, or zirconia. Zirconia beads are often preferred because of their relatively high density. The mixing time is usually about 10 to about 30 minutes for a premix having a weight of about 0.1 kg to about 0.5 kg.

The oxide matrix material and a portion of the zirconia spheres are then added to the premix. Typically, about ⅛ to ⅔ of the total amount of zirconia spheres to be used is added to this secondary mixture (sometimes referred to herein as "slurry A"). This amount can be adjusted, based on various factors, such as the time it takes for the spheres to become incorporated into the mixture. Afterward, the secondary mixture is mixed for about 20 to about 60 minutes, based a total weight of about 0.1 kg to about 1.0 kg. Again, milling media is sometimes used during this step.

The secondary mixture, i.e., slurry A, is then combined with the remaining zirconia spheres and the remainder of the liquid carrier, along with any other additives being used. The resulting mixture, sometimes referred to herein as "slurry B", is blended for about 10 to about 60 minutes, based a total weight of about 0.1 kg to about 1 kg. Again, milling media is sometimes used.

It should thus be understood that in some preferred embodiments of this invention, the coating composition comprises two parts. The first part is slurry A, comprising a portion of a liquid carrier, a silica source, an oxide material, and about 0% to about 40% by weight zirconia spheres, based on the total weight of slurry A. The second part is slurry B, comprising slurry A, along with the remaining portion of the liquid carrier; and an additional amount of zirconia spheres. The total amount of zirconia spheres in the overall slurry composition is as described above. Portions of slurry A and slurry B may be applied to the substrate to eventually form a single, permanent coating as described below.

The substrate may be any metallic material or alloy, and is often a heat-resistant alloy. Many of these materials are referred to as "superalloys", and they typically have an operating temperature of up to about 1000–1100° C. They are described in various references, such as U.S. Pat. Nos. 5,399,313 and 4,116,723, both incorporated herein by reference. High temperature alloys are also generally described in the Kirk-Othmer *Encyclopedia of Chemical Technology*, 3rd Edition, Vol. 12, pp.417–479 (1980), and Vol. 15, pp.787–800 (1981). Illustrative nickel-base alloys are designated by the trade names Inconel, Nimonic, Rene (e.g., Rene 80, Rene 95), and Udimet. The type of substrate can vary widely, but it is often in the form of a jet engine part, such as the airfoil of a turbine blade. As another example, the substrate may be the piston head of a diesel engine, as well as any other surface requiring a heat-resistant barrier coating.

As described in U.S. Pat. No. 5,419,971 (incorporated herein by reference), a bond coat layer is often first applied to the substrate to promote adhesion between the substrate and the subsequently-applied thermal barrier coating. The bond coating usually has a thickness in the range of about 0.003 inch to about 0.008 inch, and can be made of any of the available materials judged suitable for this purpose, e.g., aluminides; MCrAlY coatings (wherein "M" can be various metals or combinations of metals, such as Fe, Ni, Co, or Ni+Co); or other nickel-base alloys having a composition compatible with both the substrate and the TBC. Exemplary bond coatings are described in U.S. Pat. No. 5,043,138, incorporated herein by reference. The bond coating may be applied by conventional techniques, e.g., any type of slurry technique; PVD; plasma spray (e.g., air plasma); CVD; or combinations of plasma spray and CVD techniques. In the present description, "deposition on the substrate" should be construed to include the situation in which an intervening bond layer is present. Prior to deposition of the bond coat, it is usually helpful to clean the substrate by conventional techniques, e.g., ultrasonic cleaning with a solvent.

A bond coat is not always required for the present invention, and may be omitted in some situations. In those instances, the substrate can be cleaned and then roughened up, e.g., by etching in mineral acids, or by grit blasting with a suitable grit material such as $Al_2O_3$ or SiC. Adhesion of the TBC directly to the clean, roughened substrate surface may be acceptable in a variety of end use settings.

Slurry coatings based on the present invention may be applied to the substrate by a variety of techniques known in the art. (See, for example, the Kirk-Othmer *Encyclopedia of Chemical Technology*, 4th Edition, Vol. 5, pp. 606–619. They can be slip-cast, brushed-painted, dipped, sprayed, or spun-coated onto the substrate surface, for example. The substrate is usually warmed to a temperature in the range of about 20° C. to about 120° C. prior to application of the slurry coating. This pre-heating sometimes appears to enhance the uniformity and adherence of the coatings to the substrate, partly due to the fact that the applied slurry does not "run" as much.

Spray-coating is often the easiest way to apply the coating on components such as airfoils, and the viscosity of the coating for spraying can be frequently adjusted by varying the amount of liquid carrier used, for example. Again, spraying equipment suitable for this technique is known in the art. An example is the Paasche 62 sprayer, which operates at about 35–40 psi, and forms a 1–2 inch spray-fan pattern, when the spray gun is kept at about 6–8 inches from the substrate (stand-off distance). Other paint sprayers can also be used, e.g., those which operate at higher pressure and/or deliver more slurry volume.

Usually, the slurry composition is applied to the substrate in multiple passes, i.e., by applying a series of layers, with a heat treatment after the deposition of each layer. This allows for adequate, intermediate curing of each layer, and helps to prevent the occurrence of large mud cracks. A heat treatment of the final coating is also carried out.

In some embodiments, the composition of each layer (including the first layer)is substantially identical, i.e., in terms of the amount of zirconium spheres oxide matrix material, and the other optional ingredients. However, in preferred embodiments, the first layer applied, sometimes referred to herein as the "base layer", contains a significantly smaller amount of zirconia spheres than upper layers or "top coatings" which are subsequently applied. It appears that using a lower amount of spheres (or even having no spheres) in the base coating results in a final coating which is more uniform, adherent, and free of large mud cracks. Thus, the base layer is usually formed of a composition similar to slurry A as described above.

Each "topcoat" (a term used herein to refer to every layer applied above the base layer) usually contains a larger amount of zirconia spheres than in the base layer, and is usually similar to the composition of slurry B, described above. It is not necessary that the composition of each topcoat be identical to another topcoat, although obtaining the topcoat material from a single source can simplify the process. However, it would also be possible to vary the composition of each topcoat, so as to gradually increase the number of zirconia spheres that are present in each coating pass. For example, for a final coating formed with 4 to 8 topcoats, each successive topcoat could contain about 5% to about 15% more zirconia spheres than the previous topcoat, with the proviso that the final amount of spheres be within the guidelines described herein.

Thus, one embodiment for coating the substrate includes the following steps:

(a) applying a layer of a slurry base composition which comprises spheres of zirconia contained within a porous oxide matrix, wherein the zirconia spheres are present at about 0% to about 40% by weight, based on the weight of the entire base composition;

(b) heat-treating the applied base layer according to a temperature/time schedule sufficient to remove substantially all volatile material in the base composition while preventing excessive bubbling.

(c) applying at least two successive, slurry top coatings on top of the base coating to form a final coating, wherein each top coating is formed of a composition comprising spheres of zirconia contained within a porous oxide matrix, and wherein the zirconia spheres are present at about 25% to about 99% by weight, based on the total weight of each top coating;

(d) heat-treating each top coating after it has been applied, according to a temperature/time schedule sufficient to remove substantially all volatile material in the top coating while preventing excessive bubbling in the coating; and then (e) heat-treating the final coating according to a temperature/time schedule sufficient to consolidate the coating.

The appropriate time/temperature schedule for step (b) will of course depend on various factors, but it is usually about 5 minutes to about 60 minutes, at a temperature in the range of about 50° C. to about 150° C. If the temperature is too high for a given volatile material, its quick evaporation can lead to bubbling, which may result in coating defects. The volatility of components in the slurry composition can be determined by a variety of techniques, such as differential thermal analysis (DTA) and thermal gravimetric analysis (TGA). The time/temperature schedule for step (d) will also vary, but it is usually similar to that of step (b).

For step (e), consolidation of the coating is accomplished when (1) the organic materials are evaporated or "burned out"; and the coating becomes (2) densified and/or (3) the matrix becomes crystallized. Usually the time/temperature schedule is about 1 minute to about 60 minutes, at a temperature in the range of about 650° C. to about 1200° C.

In some embodiments of this invention, each top coating in step (c) does not have to include the zirconia spheres, e.g., several of them could be based on the oxide matrix material by itself, or with any of the additives discussed above. However, in preferred embodiments, the composition of each top coating does include the spheres.

The heat treatment of the base layer and each top coating can be carried out by a variety of techniques, such as oven-drying and using any standard heat lamp (preferably having an output of between 200 watts and 1000 watts). The advantage of the heat lamp is its portability when repairing coatings at remote locations.

In preferred embodiments, the heat treatment temperature for step (b) is in the range of about 60° C. to about 100° C., and the duration of heat treatment is in the range of about 15 minutes to about minutes. Moreover, in preferred embodiments, the heat treatment temperature for step (d) is in the range of about 60° C. to about 100° C., and the duration of heat treatment is in the range of about 15 minutes to about 30 minutes. In preferred embodiments, the heat treatment temperature for the final coating in step (e) is in the range of about 700° C. to about 1000° C., and the duration of the heat treatment is in the range of about 5 minutes to about 60 minutes.

Furthermore, the initial heat treatments in steps (c) and (d) can be followed in some circumstances by a relatively rapid, high-heat treatment, e.g., using a torch or a high-wattage lamp (e.g., about 1500–2500 Watts) which produces a temperature in the range of about 600° C. to about 1000° C. This high-heat temperature treatment is usually carried out for about 30 seconds to about 2 minutes. Alternatively, when the substrate is a section of a gas turbine engine, the high-heat treatment can be carried out by firing the engine. Regardless of how the heat treatments are carried out, their adequacy can be determined in part by examination of the coatings after they are cooled, in regard to appearance, adhesion, and other physical tests described below.

In a variation of the coating processes described above, one or more of the heat treatments can be carried out by gradually heating the coating layers after they are deposited. Thus, the steps could comprise:

(I) applying a layer of a slurry base composition which comprises spheres of zirconia contained within a porous oxide matrix, wherein the zirconia spheres are present at 0% to about 40% by weight, based on the weight of the entire base composition;

(II) heat-treating the applied base layer for about 5 minutes to about 60 minutes, at a temperature in the range of about 50° C. to about 100° C.;

(III) applying at least two successive, slurry top coatings on top of the base layer to form a final coating, wherein each top coating is formed of a composition comprising spheres of zirconia contained within a porous oxide matrix, and wherein the zirconia spheres are present at about 25% by weight to about 99% by weight, based on the total weight of each top coating;

(IV) heat-treating each top coating after it has been applied, by gradually increasing the temperature to which the coating is exposed, from about 30° C. to about 800° C. over a time period of from about 1 minute to about 60 minutes; and then (V) heat-treating the final coating for about 15 minutes to about 120 minutes, at a temperature in the range of about 650° C. to about 1200° C.

In some preferred embodiments, the heat treatments of the top coats in step (IV) can be carried out by raising the temperature from an initial temperature of about 30° C. to about 70° C. to a final temperature of about 700° C. to about 800° C., at an increase of about 10 degrees to about 25 degrees per minute. Moreover, the heat treatment of step (V) can be carried out by raising the temperature from an initial temperature of about 30° C. to about 70° C., to a final temperature of about 1000° C. to about 1200° C., at an increase of about 10 degrees to about 25 degrees per minute. The final temperature reached in step (V) can be maintained for about 5 minutes to about 60 minutes. A helpful guideline for this time period is typically based on a regimen of about 10 minutes to about 30 minutes heating time for every 5 mils of coating thickness. As described previously, the most appropriate time and temperature will be determined in part by an inspection of the final coating, and a review of the various physical tests performed on the coating.

As in the previously-described embodiment, each initial heat treatment in steps (I), (II), and (IV) can be followed in some circumstances by a relatively rapid, high-heat treatment, e.g., using a torch or a high wattage lamp which produces a temperature in the range of about 600° C. to about 1000° C., for about 1 minute to about 5 minutes. For step (IV), the torch (or high wattage lamp) treatment does not have to be applied to every top coating, although it is usually desirable to do so if this high-heat treatment is in fact undertaken.

Alternatively, when the substrate is a section of a gas turbine engine exposed to the engine's thrust or combustion, the high-heat treatment can be carried out by firing the engine, which can readily deliver the required temperatures.

The number of top coatings will be determined by various factors, such as the required thickness for the overall coating; the particular rheological characteristics for the coating composition; the evaporation rates for the volatile components in the composition, and the shrinkage rate of the coating as the volatile coatings evaporate. In general, the number of top coatings will range from about 2 to about 30, with about 4 to about 8 top coatings usually being preferred. The thickness of each top coating (as applied) will usually be in the range of about 0.1 mil to about 1.5 mils, and preferably in the range of about 0.5 mil to about 1.5 mils. The thickness of the base coating will usually be in the range of about 0.25 mil to about 2 mils, and preferably in the range of about 0.5 mil to about 1.5 mils.

The TBC in its final state, i.e., after being fired and cooled to ambient temperature, is in the form of a composite coating, which represents yet another embodiment of this invention: The composite comprises (i) an oxide matrix phase as described above; (ii) zirconia spheres embedded in the oxide matrix; and (iii) a porous phase. In general, the composite comprises about 3% to about 50% by volume of the oxide matrix; about 20% to about 70% by volume of the zirconia spheres; and about 5% to about 60% by volume of the porous phase.

In most of the preferred embodiments, the composite comprises about 5% to about 30% by volume of the oxide matrix; about 50% to about 65% by volume of the zirconia spheres; and about 5% to about 10% by volume of the porous phase.

EXAMPLES

The following examples are provided for illustration, and should not be considered to be any type of limitation on the scope of the present invention.

Example 1

Slurry coatings were prepared for evaluation. The silicone resin, SR-350, is available from GE Silicones. It is based on a dry silicone binder with a silicon-oxygen backbone, which retains 80% of its weight when heated to about 900° C. The lubricant (UCON-50MB-2000) is a polyalkylene glycol monobutyl ether material available from Union Carbide.

The following ingredients were added to a Nalgene bottle in the order listed below.

15 g ethanol (EtOH)
7 g SR-350 silicone resin
5 g of UCON lubricant.

The ingredients were mixed on a paint shaker with a few zirconia milling beads for 15 minutes. (In preferred embodiments, an ultrasonic agitator would typically be used.) The resulting mixture was homogenous and translucent.

22.5 g of SM8 submicron alumina was then added, followed by mixing on the paint shaker for 35–40 minutes. Then, 17.25 g of YSZ spheres (#1) (spheres made from zirconia and 7% by weight yttria; approximately 20–50% of them were hollow) were added, followed by hand-mixing for 10–20 minutes. The resulting composition was designated "Slurry A", and was fluid and white in color. "Slurry A" was prepared in identical fashion, but it did not include any zirconia spheres.

Subsequently, "Slurry B" was prepared by hand-mixing the following ingredients in the given order:

10 g of ethanol 10 g of YSZ spheres (same as above)

10 g of Slurry A

Five sample buttons were prepared. Three of the substrates were made from Rene N-5, a nickel-based superalloy, and two were made from Inconel™ 718, another nickel-based superalloy. Each substrate was coated with 1 base coating of Slurry A and 4 top coatings of Slurry B, using a Paasche 62 sprayer. Each individual layer constituted approximately 1 mil of the final coating thickness.

The samples were heated to 100° C. between intermediate top coatings in a drying oven, before the final heat-treatment at 1100° C. for 60 minutes. The most preferred coatings resulting from the process were uniform, smooth, and adherent. They are collectively designated as sample 3 in Table 1 below. The table also includes the results for other samples which were processed differently. Results for various physical tests are also provided.

1. The following ingredients were added to a Nalgene bottle in the order listed below:

30 g ethanol (EtOH)

14 g SR-350 silicone resin 10 g of UCON lubricant.

The ingredients were mixed on a paint shaker with a few zirconia milling beads for 15 minutes. The mixture was homogenous and translucent.

45 g of SM8 submicron alumina was then added, followed by mixing on the paint shaker for 35–40 minutes. Then, 34.5 g of YSZ spheres (#1) (spheres made from zirconia and 7% by weight yttria; approximately 20–50% of them were hollow) were added, followed by hand-mixing for 10–20 minutes. The resulting composition was designated "Slurry A", and was fluid and white in color.

Subsequently, a second slurry was prepared, in two versions: "Slurry B" and "Slurry B'". In each case, the following ingredients were hand-mixed in the given order:

TABLE 1

| Slurry Sample # | Composition* | Description (Inconel 718) | Adhesion** (Inconel 718) | Furnace Cycle Test*** (Rene N-5) | Jet Engine Test**** (Rene N-5) |
|---|---|---|---|---|---|
| 1 | Slurry A: AS/EtOH only; Slurry B: AS/YSZ/EtOH (1:1:1) | Thickness: 200 um (8 mils); 30 V % spheres; None in base layer | 1,061 psi | 251 cycles | 90% failure (perimeter-type failure) |
| 2 | Identical to sample 1, but with complete annealing betw. coating layers. | Thickness: 200 um (8 mils); 10% V spheres; none in base layer | 641 psi | 251 cycles | Less than 5 failure (chip perimeter failure) |
| 3 | Slurry A' AS/YSZ/EtOH Slurry B: Slurry A/YSZ/EtOh (1:1:1) | Thickness: 125 um (5 mils); 30 V % spheres (total spheres) | 2,060 psi | 721 cycles | No failure |
| 4 | Slurry A'/YSZ/EtOH, in 1:1.5:1 ratio (every coating layer) | Thickness: 175 um (7 mils) 50 V % spheres (total spheres) | — | 582 cycles | Less than 10 failure (chip perimeter failure) |

*AS = aluminosilicate matrix.; EtOH = ethanol; YSZ = yttrium-stabilized zirconia spheres, as described previously. Slurry A has no spheres in base layer; Slurry A' does contain spheres in base layer.
**Tensile Adhesion Test; ASTM C633.
***Furnace Cycle Test: Heat from room temperature to 2000° F. in 9 minutes; remain at isothermal state for 45 minutes; cool-down to 130–150° F. in 10 minutes. This equals "1 cycle".
****Jet Engine Test (JETS): 20 second hold at 2,100° F.; 20 second cool-down; 2,000 cycles.

The sample 3 materials exhibited properties which exceeded the requirements for TBC's for aircraft and power-generation engines. Samples 1, 2, and 4 would be acceptable for end uses which are exposed to less demanding conditions, e.g., where temperature ranges are not as high (for example, less than about 900° C.) and/or thermal cycling is not as rigorous.

Example 2

Unless otherwise indicated, the identity of the components for the slurry compositions is as described in Example

| Slurry B | Slurry B' |
|---|---|
| 30 g of EtOH | 30 g of ETOH |
| 30 g of HS-YSZ spheres (#A) | 60 g of HS-YSZ spheres (#A) |
| 30 g of Slurry A | 30 g Slurry A |

Each sample was hand-shaken, without any milling media, in preparation for spray-painting. Seven sets of sample-buttons were prepared. Each set contained two Rene N-5 buttons and two MAR-509 (another nickel-based superalloy) buttons. The results are shown in Table 2 below.

TABLE 2

| Slurry Sample # | Composition* | # of Top Coatings | Intermediate Curing | Final Curing | Adhesion Test | Furnace Cycle Test*** | Comments |
|---|---|---|---|---|---|---|---|
| 5 | Base Layer: Slurry A Top Coating Slurry B | 4 | Oven-dry at 100 C°. | 1100° C. for 60 min @ 1000° C./hr rate | 248 psi | 1014 (40% spa;-lation) | Uniform, adherent coatings |
| 6 | Base Layer: Slurry A Top Coating Slurry B | 8 | Oven-dry at 100° C. | 1100° C. for 60 min @ 1000° C./rate | Failed | 178 (50% spallation) | Unifrom, adherent coatings, with visible mudcracks |
| 7 | Base Layer: Top Coating Slurry B | 8 | Heat Lamp at about 80° C. for 15–20 min. | $H_2$—$O_2$ torch for 10 min.[a] | — | 20; cracks | Coatings bubbled[b] |
| 8 | Base Layer: Slurry A Top Coating Slurry B | 8 | Heat Lamp at about 80° C. for 15–20 min. | $H_2$—$O_2$ torch for 10 min.; cure at 4th coat also.[c] | 572 | — | No bubbling; uniform, adherent coatings. |
| 9 | Base Layer: Slurry A Top Coating Slurry B'[d] | 5 | Heat Lamp (80° C. for 15–20 min.); torch for 10 min. | $H_2$—$O_2$ torch-each coat[e] | — | 622: (40% spallation) | Rough, but uniform, adherent coatings[f]. |
| 10 | Base Layer: Slurry A Top Coating Slurry B[g] | 8 | Heat Lamp (80° C. for 15–20 min.); torch for 10 min. | $H_2$—$O_2$ torch-each coat[e] | 1033 | 218; (40% spallation) | Uniform, adherent coatings[h] |
| 11 | Base Layer: Slurry A Top Coating Slurry B[j] | 8 | Heat Lamp (80° C. for 15–20 min.); torch for 10 min. | Heat Lamp[h] and $H_2$—$O_2$ torch-each coat | 710 | 893; (40% spallation) | Uniform, adherent coatings |

Table 2 Footnotes:
* Slurry Compositions: Slurry A: ethanol/silicone resin/UCON lubricant/alumina/zirconia spheres; Slurry B: ethanol/zirconia spheres/slurry A; Slurry B': Same as B, but with greater amount of spheres; (See above for further detail regarding the slurry compositions.)
**Tensile Adhesion Test; ASTM C633.
***Furnace Cycle Test: Same procedure as in Example 1.
a) Torch from low to red-hot. Duration of about 1–2 minutes at red-hot state; 10 minute torch time.
b) Coatings bubbled due to excessive trapping of organic compounds during sudden heating.
c) Same schedule as for sample 7, but with final cure (torch) after both 4th and 8th layers.
d) Thickness: 200 um (8 mils); 40 V % spheres.
e) Same schedule as for sample 7, but with torching after each coating, to remove organic compounds.
f) Coating thickness of 20–25 mils; measured by micrometer.
g) Thickness: 450 um (17 mils); 40 V % spheres.
h) Coating thickness of 15–20 mils; measured by micrometer.
i) Thickness: 450 um (17 mils); 40 V % spheres.

In those experiments in which the heat-lamp was used for intermediate curing, the temperature was measured to be approximately 75° C. For the final curing with a hydrogen-oxygen torch, the substrate and the slurry coating were slowly brought to red-heat temperatures over a period of 10 minutes. The red-heat temperature produced by the torch was estimated by an optical pyrometer to be in the range of about 900YC to about 1050YC.

Some mention should be made regarding cracks and pores in coatings like those of the present invention. Cracks and pores can result from shrinkage related to organic "burn-out", or from volume changes resulting from densification and crystallization. In general, cracks with relatively small openings, i.e., less than about 25 microns, are usually acceptable, as long as the coating does not peel off the substrate, and as long as it retains its other properties. Pores throughout the coating structure are also usually acceptable, as long as they are less than about 75 microns in diameter. In fact, the small 40 cracks and pores are often actually helpful because they tend to allow some stress-relieving thermal expansion.

Example 3

This example demonstrates the benefit of slurry coating compositions and related techniques of the present invention for the patch-repair of a substrate. Test samples were prepared by attaching various-shaped nickel-foil masks onto bond-coated, nickel-based superalloy buttons. A conventional air-plasma technique was then used to coat the button. Subsequently, the masks were removed to uncover the deliberately-formed spalls. The spall area was then coated, using the technique generally described in Example 1 (sample 3), with a Slurry A-base coating and 8 to 20 applied top coatings of Slurry B (i.e., multiple samples were prepared). The total coating thickness averaged about 10–25 mils. The intermediate and final heat treatment regimen set forth in that Example 1 was also followed here. Afterward, the coating was polished back to the thickness of the air-plasma-deposited coating. The results for representative samples were as follows:

Furnace Cycle Test: 1500 cycles before failure
Jet Engine Test: No failure
Adhesion Test (average) Approximately 6000 psi.

These results demonstrate the exceptional utility of the present invention in performing field repairs on TBC's. The repaired coating-section clearly exhibits very desirable properties which are comparable to those of the originally-applied TBC.

While preferred embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

All of the patents, articles, and texts mentioned above are incorporated herein by reference.

What is claimed:

1. An improved method for coating at least a portion of a metal-based substrate, comprising the following steps:

(a) applying a layer of a slurry base composition which comprises a porous oxide matrix and about 0% to about 40% by weight zirconia spheres contained within the matrix, based on the weight of the entire base composition;

(b) heat-treating the applied base layer according to a time/temperature schedule sufficient to remove substantially all volatile material in the base composition while preventing excessive bubbling;

(c) applying at least one successive, slurry top coating on top of the base layer to form a final coating, wherein at least one coating is formed of a composition comprising spheres of zirconia contained within a porous oxide matrix, and wherein the zirconia spheres are present at about 25% to about 99% by weight, based on the total weight of the top coating;

(d) heat-treating each top coating after it has been applied, according to a time/temperature schedule sufficient to remove substantially all volatile material in the top coating while preventing excessive bubbling; and (e) heat-treating the final coating according to a time/temperature schedule sufficient to consolidate the coating.

2. The method of claim 1, wherein the time/temperature schedule of step (b) is about 5 minutes to about 60 minutes, at a temperature in the range of about 50° C. to about 150° C.

3. The method of claim 1, wherein the time/temperature schedule of step (d) is about 5 minutes to about 30 minutes, at a temperature in the range of about 50° C. to about 150° C.

4. The method of claim 1, wherein the time/temperature schedule of step (e) is about 1 minute to about 60 minutes, at a temperature in the range of about 650° C. to about 1100° C.

5. The method of claim 1, wherein at least about 20% of the total number of zirconia spheres are hollow.

6. An improved method for providing a protective coating on at least a portion of a metal-based substrate, comprising the following steps:

(I) applying a layer of a slurry base composition which comprises a porous oxide matrix and about 0% to about 40% by weight zirconia spheres contained within the matrix, based on the weight of the entire base composition;

(II) heat-treating the applied base layer according to a time/temperature schedule sufficient to remove substantially all volatile material in the base composition while preventing excessive bubbling;

(III) applying at least one successive, slurry top coating on top of the base layer to form a final coating, wherein at least one top coating is formed of a composition comprising spheres of zirconia contained within a porous oxide matrix, and wherein the zirconia spheres are present at about 25% to about 99% by weight, based on the total weight of each top coating;

(IV) heat-treating each top coating after it has been applied, by gradually increasing the temperature to which the top coating is exposed, from about 30° C. to about 800° C. over a time period of from about 1 minute to about 60 minutes; and (V) heat-treating the final coating according to a time/temperature schedule sufficient to consolidate the coating.

7. The method of claim 6, wherein the time/temperature schedule of step (II) is about 5 minutes to about 60 minutes, at a temperature in the range of about 50° C. to about 150° C.

8. The method of claim 6, wherein the time/temperature schedule of step (V) is about 15 minutes to about 120 minutes, at a temperature in the range of about 650° C. to about 1100° C.

9. The method of claim 6, wherein, after at least one of the top coatings is heat-treated in step (IV), it is then exposed to either a torch or a high-wattage lamp directed to its surface.

10. The method of claim 6, wherein the heat treatments of the top coatings in step (IV) are carried out by raising the temperature from an initial temperature to a final temperature, at an increase of about 10 degrees to about 25 degrees per minute.

11. The method of claim 6, wherein the heat treatment of step (V) is carried out by raising the temperature from an initial temperature of about 30° C. to about 70° C., to a final temperature of about 1000° C. to about 1200° C., at an increase of about 10 degrees to about 25 degrees per minute.

12. The method of claim 6, wherein the final temperature reached in step (V) is maintained for about 5 minutes to about 60 minutes.

13. The method of claim 6, wherein the heat treatment of step (V) is carried out by means of a torch or high-wattage lamp directed to the surface of the final coating.

14. The method of claim 13, wherein the temperature produced by the torch or high-wattage lamp is in the range of about 600° C. to about 1000° C.

15. The method of claim 6, wherein the metal-based substrate is a section of a gas turbine engine exposed to engine combustion temperatures, and step (V) is carried out by firing the engine.

* * * * *